United States Patent
Mikuni et al.

(10) Patent No.: US 12,434,742 B2
(45) Date of Patent: Oct. 7, 2025

(54) VEHICLE

(71) Applicant: SUBARU CORPORATION, Tokyo (JP)

(72) Inventors: Tsukasa Mikuni, Tokyo (JP); Takuya Homma, Tokyo (JP); Junichi Motoyama, Tokyo (JP); Ryota Nakamura, Tokyo (JP); Kazuhiro Hayakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

(21) Appl. No.: 18/350,139

(22) Filed: Jul. 11, 2023

(65) Prior Publication Data

US 2024/0043044 A1     Feb. 8, 2024

(30) Foreign Application Priority Data

Aug. 4, 2022    (JP) .................................. 2022-125125

(51) Int. Cl.
*B60W 60/00* (2020.01)
*B60W 50/14* (2020.01)

(52) U.S. Cl.
CPC ........ *B60W 60/0051* (2020.02); *B60W 50/14* (2013.01); *B60W 2420/403* (2013.01); *B60W 2510/18* (2013.01); *B60W 2510/20* (2013.01)

(58) Field of Classification Search
CPC ............. B60W 60/0051; B60W 50/14; B60W 2420/403; B60W 2510/18; B60W 2510/20; B60T 8/1755; B62D 1/00; G01S 13/93; B60R 1/20

USPC .......................................................... 701/23
See application file for complete search history.

(56) References Cited

U.S. PATENT DOCUMENTS

| | | | |
|---|---|---|---|
| 9,672,446 B1* | 6/2017 | Vallespi-Gonzalez | ....................... H04N 13/239 |
| 2015/0106007 A1 | 4/2015 | Matsumura | |
| 2021/0197797 A1* | 7/2021 | Umetsu | ............... B60W 50/082 |
| 2021/0357670 A1* | 11/2021 | Wu | ........................... G06T 7/70 |

(Continued)

FOREIGN PATENT DOCUMENTS

| | | |
|---|---|---|
| JP | 2012-43279 A | 3/2012 |
| JP | 2015-77863 A | 4/2015 |

(Continued)

*Primary Examiner* — Tuan C To
(74) *Attorney, Agent, or Firm* — Rimon P.C.

(57) ABSTRACT

A vehicle includes a storage, an obtainer, an extractor, a comparator, and a notification processor. The storage is configured to store first vehicle data in association with first image data. The obtainer is configured to acquire second vehicle data and second image data. The extractor is configured to extract, from the first vehicle data and the first image data stored in the storage, the first vehicle data that is identical or similar to road data obtained from the second image data. The comparator is configured to compare the second vehicle data acquired by the obtainer with the first vehicle data extracted by the extractor, and obtain a difference value between the second vehicle data and the first vehicle data. The notification processor is configured to execute, when the difference value obtained by the comparator exceeds a predetermined value, a notification that the difference value exceeds the predetermined value.

5 Claims, 6 Drawing Sheets

(56) References Cited

U.S. PATENT DOCUMENTS

2022/0324475 A1* 10/2022 Nobayashi ............. G06V 20/58
2023/0162508 A1*  5/2023 Xia ................. B60W 60/00274
                                                       382/104

FOREIGN PATENT DOCUMENTS

WO      WO-9729437 A1 *  8/1997  ........... G06K 9/3233
WO      WO-2010122409 A1 * 10/2010  ......... G06K 9/00805

* cited by examiner

FIG. 1

| ROAD SHAPE | STEERING WHEEL STEERING ANGLE | ACCELERATOR OPERATION | BRAKE OPERATION | VEHICLE SPEED |
|---|---|---|---|---|
| A | 0 | 0 | 3 | 20km/h |
| B | 0 | 0 | 4 | 15km/h |
| C | 0 | 0 | 2 | 25km/h |
| D | 0 | 0 | 2 | 25km/h |
| E | 0 | 0 | 3 | 20km/h |
| F | 0 | 0 | 1 | 30km/h |
| G | 0 | 0 | 4 | 15km/h |
| H | 0 | 0 | 5 | 10km/h |
| I | 0 | 0 | 3 | 20km/h |

VEHICLE

CROSS-REFERENCE TO RELATED APPLICATIONS

The present application claims priority from Japanese Patent Application No. 2022-125125 filed on Aug. 4, 2022, the entire contents of which are hereby incorporated by reference.

BACKGROUND

The disclosure relates to a vehicle. An example driving assist technique in recent years performs learning on an operation of a vehicle performed so far by a driver who drives the vehicle at a deceleration necessary point at which deceleration of the vehicle is necessary, such as an intersection, and starts a control such as a braking control at a position corresponding to a driver's preference.

For example, Japanese Unexamined Patent Application Publication (JP-A) No. 2012-43279 discloses such a driving assist technique that includes: a map data storage unit that stores map data of a deceleration necessary point; a vehicle position detection unit that detects a position of a vehicle; an operation detection unit that detects an operation such as a deceleration operation of the vehicle; and an operation position learning unit that learns a position that is in front of the deceleration necessary point and at which the operation such as the deceleration is performed. The operation position learning unit learns the operation such as the deceleration in association with a separation distance, from the deceleration necessary point, of the position at which the operation such as the deceleration is performed.

As a similar driving assist technique, JP-A No. 2015-77863 discloses a technique related to a driving assist apparatus that performs a driving assist, based on traveling data obtained while a driver who drives a vehicle performs a driving operation to cause the vehicle to travel. The technique includes: a storage unit that stores a vehicle speed at each position on a traveling route, based on the vehicle speed acquired when the driver performs an acceleration/deceleration operation to cause the vehicle to travel; and a traveling control unit that performs a traveling control, based on the vehicle speed at each position stored in the storage unit and a current position of the vehicle. The traveling control unit ends the traveling control, when the vehicle speed of the vehicle becomes less than a threshold during the deceleration performed by the traveling control.

SUMMARY

An aspect of the disclosure provides a vehicle including a storage, an obtainer, an extractor, a comparator, and a notification processor. The storage is configured to store first vehicle data in association with first image data, in which the first vehicle data includes past data of the vehicle on one or more of steering wheel steering data, accelerator or brake operation data, and vehicle speed data, and the first image data includes past image data of the vehicle on a region in front of the vehicle. The obtainer is configured to acquire second vehicle data and second image data, in which the second vehicle data includes current data of the vehicle on the one or more of the steering wheel steering data, the accelerator or brake operation data, and the vehicle speed data, and the second image data includes current image data of the vehicle on the region in front of the vehicle. The extractor is configured to extract, from the first vehicle data and the first image data stored in the storage, the first vehicle data that is identical or similar to road data obtained from the second image data. The comparator is configured to compare the second vehicle data acquired by the obtainer with the first vehicle data extracted by the extractor, and obtain a difference value between the second vehicle data and the first vehicle data. The notification processor is configured to execute, when the difference value obtained by the comparator exceeds a predetermined value, a notification that the difference value exceeds the predetermined value.

An aspect of the disclosure provides a vehicle including a storage and circuitry. The storage is configured to store first vehicle data in association with first image data, in which the first vehicle data includes past data of the vehicle on one or more of steering wheel steering data, accelerator or brake operation data, and vehicle speed data, and the first image data includes past image data of the vehicle on a region in front of the vehicle. The circuitry is configured to: acquire second vehicle data and second image data, in which the second vehicle data includes current data of the vehicle on the one or more of the steering wheel steering data, the accelerator or brake operation data, and the vehicle speed data, and the second image data includes current image data of the vehicle on the region in front of the vehicle; extract, from the first vehicle data and the first image data stored in the storage, the first vehicle data that is identical or similar to road data obtained from the second image data; compare the acquired second vehicle data with the extracted first vehicle data to obtain a difference value between the second vehicle data and the first vehicle data; and execute, when the difference value exceeds a predetermined value, a notification that the difference value exceeds the predetermined value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Techniques disclosed in JP-A Nos. 2012-43279 and 2015-77863 both learn an operation of a vehicle performed by a driver who drives the vehicle on a route having been travelled by the vehicle before, and execute a driving assist control on the same route, based on a result of the learning. Accordingly, the techniques disclosed in JP-A Nos. 2012-

43279 and 2015-77863 involve difficulties in performing a control related to driving for a route on which the vehicle travels for the first time.

It is desirable to provide a vehicle that makes it possible to execute a control that reduces a sense of discomfort to be given to a driver who drives the vehicle, even for a route on which the vehicle travels for the first time.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A vehicle 1 according to an example embodiment will be described with reference to FIGS. 1 to 6.

Configuration of Vehicle 1

Figure 1:
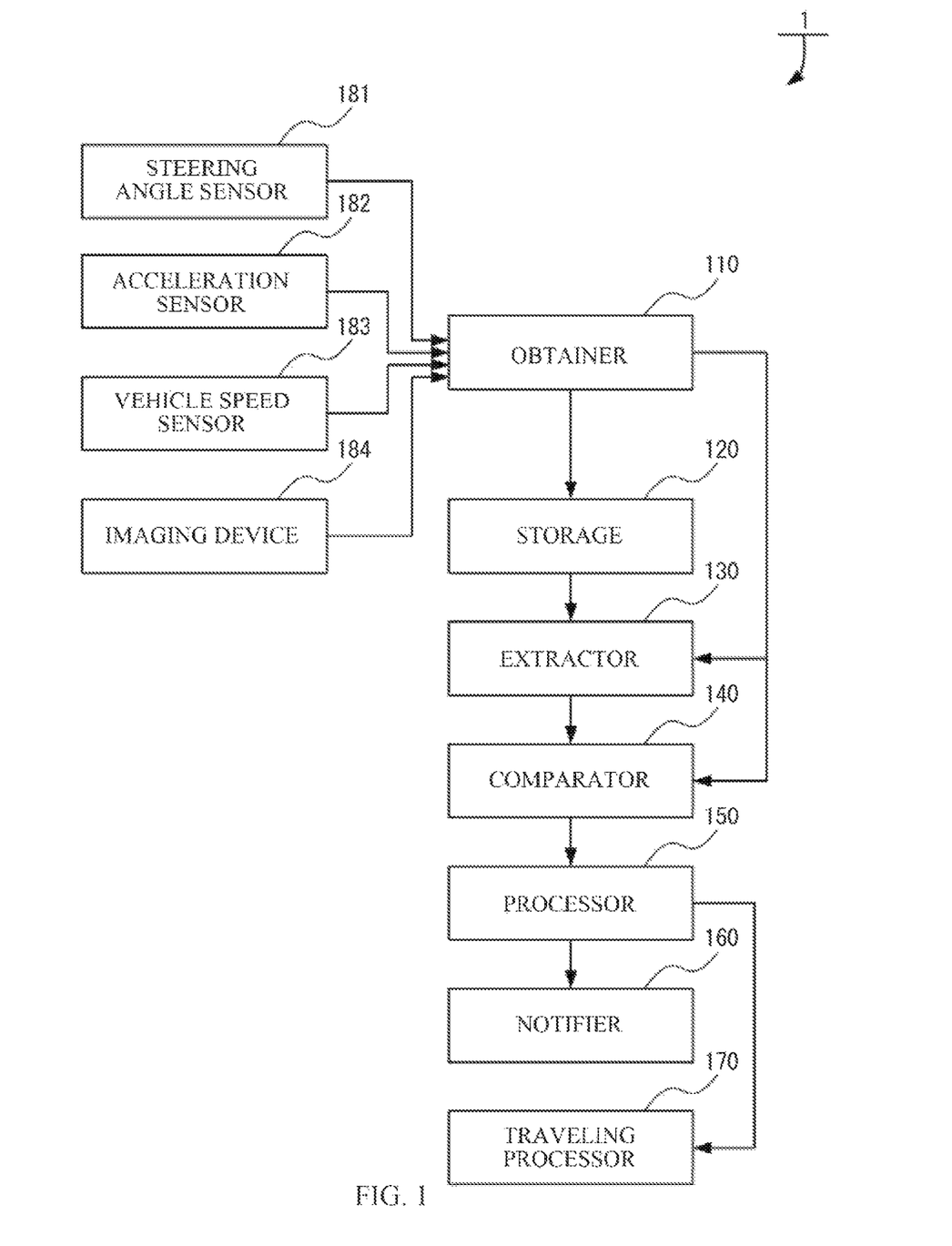
FIG. 1 is a diagram illustrating a configuration of a vehicle according to one example embodiment of the disclosure.

Referring to FIG. 1, the vehicle 1 according to the example embodiment may include an obtainer 110, a storage 120, an extractor 130, a comparator 140, a processor 150, a notifier 160, a traveling processor 170, a steering angle sensor 181, an acceleration sensor 182, a vehicle speed sensor 183, and an imaging device 184.

The obtainer 110 may acquire current steering wheel steering data, current accelerator or brake operation data, current vehicle speed data, and current front image data.

In some embodiments, the obtainer 110 may acquire second vehicle data and second image data. The second vehicle data may include current data of the vehicle 1 on one or more of the steering wheel steering data, the accelerator or brake operation data, and the vehicle speed data. The second image data may include current image data of the vehicle 1 on a region in front of the vehicle 1.

For example, the obtainer 110 may acquire the steering wheel steering data from a sensor output outputted from the steering angle sensor 181, the accelerator or brake operation data from a sensor output outputted from the acceleration sensor 182, the vehicle speed data from a sensor output outputted from the vehicle speed sensor 183, and the front image data from a picture output outputted from the imaging device 184.

The accelerator or brake operation data may include an operation timing.

In some embodiments, the accelerator or brake operation data may include data on a timing at which an accelerator or a brake is operated.

The steering angle sensor 181 may detect a steering angle of a steering wheel. For example, the steering angle sensor 181 may be attached to a steering shaft, and output signals corresponding to a steering direction, a neutral position, and the steering angle.

The acceleration sensor 182 may be an inertial sensor that detects a magnitude of an acceleration rate of the vehicle 1. The acceleration sensor 182 may be based on a resistance line strain gauge, a semiconductor gauge, a piezoelectric element, a capacitance, or a differential transformer, although a type of the acceleration sensor 182 is not limited thereto.

Hereinafter, an example embodiment of the vehicle 1 will be described in which the operation data of the accelerator or the brake as data on an operation of the accelerator or the brake, which is one of behaviors, is to be obtained from the sensor output outputted from the acceleration sensor 182.

The vehicle speed sensor 183 may detect a traveling speed of the vehicle 1. For example, the vehicle speed sensor 183 may detect a rotational speed of an output shaft.

The vehicle speed sensor 183 may be any sensor such as a vehicle speed pulse sensor.

The imaging device 184 may include a monocular camera or a stereo camera. The imaging device 184 may acquire an image in front of the vehicle 1.

The image may include a still image or a moving image.

Pieces of data including the current steering wheel steering data, the current accelerator or brake operation data, the current vehicle speed data, and the current front image data acquired by the obtainer 110 may be outputted to the extractor 130 or the comparator 140.

The storage 120 may store past steering wheel steering data, past accelerator or brake operation data, and past vehicle speed data in a database format in association with past front image data.

In some embodiments, the storage 120 may store first vehicle data in association with first image data. The first vehicle data may include past data of the vehicle 1 on one or more of the steering wheel steering data, the accelerator or brake operation data, and the vehicle speed data. The first image data may include past image data of the vehicle 1 on the region in front of the vehicle 1.

Figure 2:
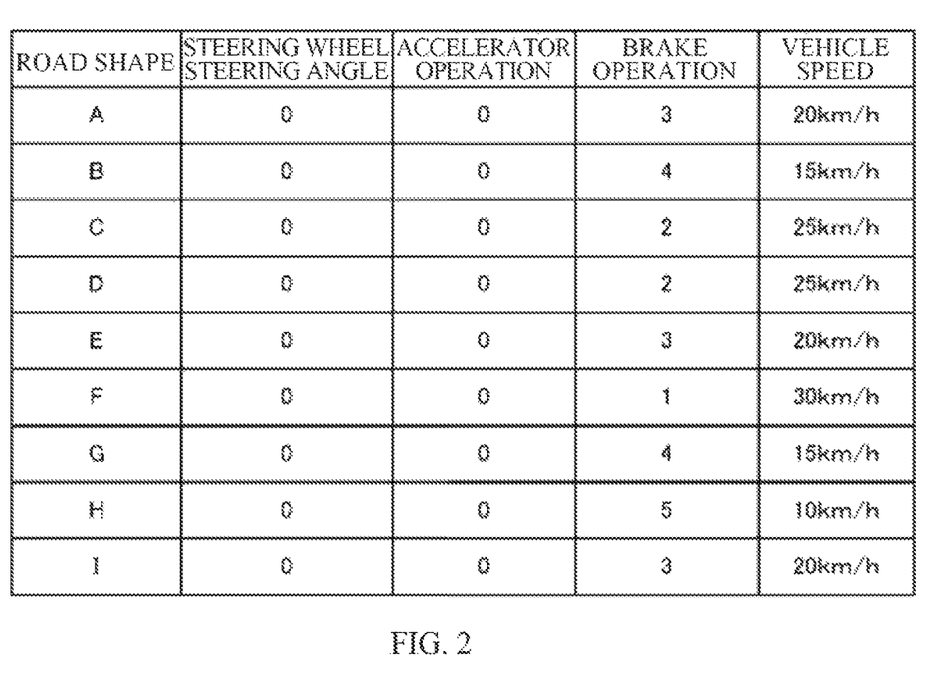
FIG. 2 is a diagram illustrating an example of a part of a database stored in a storage of the vehicle illustrated in FIG. 1.
Figure 3A:
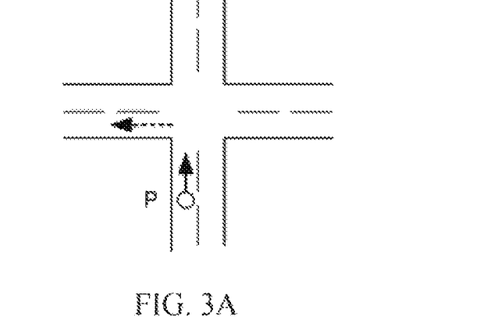
FIGS. 3A to 3B are diagrams each illustrating a shape of an intersection as an example of a road shape, in the database stored in the storage of the vehicle illustrated in FIG. 1.
Figure 3B:
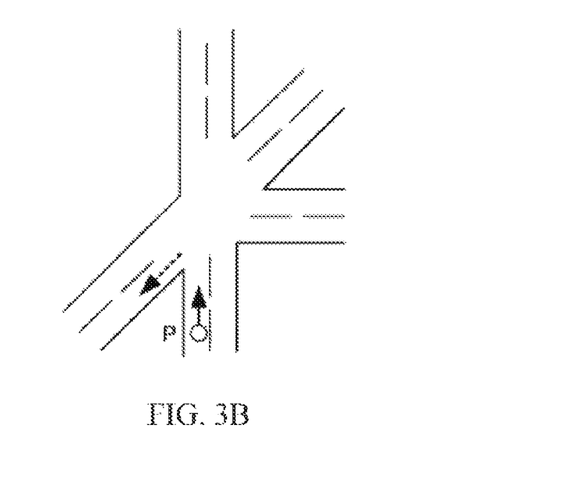
Figure 3C:
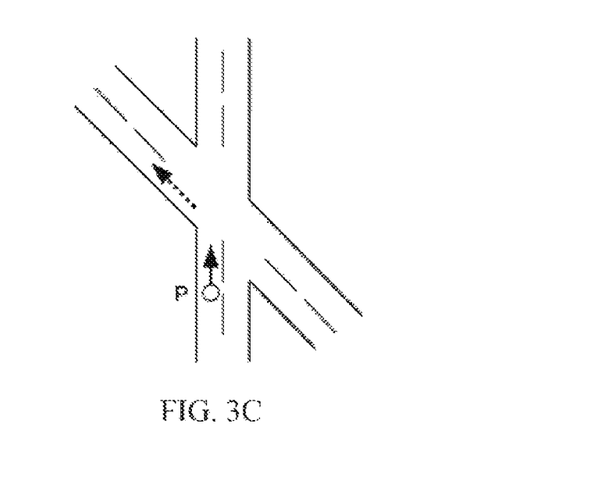

FIG. 2 illustrates a part of a database, in which "A" of a "road shape" is an ordinary intersection as illustrated in FIG. 3A, "B" is an intersection where a traveling path is inclined in a leftward downward direction with respect to a traveling direction of the vehicle 1 as illustrated in FIG. 3B, and "C" is an intersection where a traveling path is inclined in a leftward upward direction with respect to the traveling direction of the vehicle 1 as illustrated in FIG. 3C.

Further, although not illustrated, "D" is a road shape similar to "A", "E" is a road shape similar to "B", and "F" is a road shape similar to "C", each of which is an intersection where a traveling path is inclined upward to the intersection. Moreover, although not illustrated, "G" is a road shape similar to "A", "H" is a road shape similar to "B", and "I" is a road shape similar to "C", each of which is an intersection where a traveling path is inclined downward to the intersection.

FIG. 2 also illustrates respective past states of a steering wheel steering angle, an accelerator operation, a brake operation, and a vehicle speed at a point P that is in front of each of the intersections having the respective road shapes described above.

For example, the steering wheel steering angle, the accelerator operation, and the brake operation each may be divided into five levels, based on the degree of its operation.

The point P in FIGS. 3A to 3C is a point before the vehicle 1 enters the intersection. Accordingly, the steering wheel steering angle and the accelerator operation are absent, i.e., "0".

However, the point P in FIGS. 3A to 3C is a deceleration point before the vehicle 1 enters the intersection. Accordingly, for the road shape "A", the degree of the brake operation may be "3" and the vehicle speed at that time may be 20 km/h. For the road shape "B", the degree of the brake operation may be "4" that is stronger than that of the road shape "A" and the vehicle speed at that time may be 15 km/h, due to a necessity of a sharp steering wheel operation at the intersection. For the road shape "C", the degree of the brake operation may be "2" that is weaker than that of the road shape "A" and the vehicle speed at that time may be 25 km/h, due to a necessity of a gentle steering wheel operation at the intersection.

For the road shape "D", the degree of the brake operation may be "2" that is weaker than that of the road shape "A" and the vehicle speed at that time may be 25 km/h, because the traveling path is inclined upward to the intersection. For the road shape "E", the degree of the brake operation may be "3" that is weaker than that of the road shape "B" and the vehicle speed at that time may be 20 km/h, due to the necessity of the sharp steering wheel operation at the intersection. For the road shape "F", the degree of the brake operation may be "1" that is weaker than that of the road shape "C" and the vehicle speed at that time may be 30 km/h, due to the necessity of the gentle steering wheel operation at the intersection.

For the road shape "G", the degree of the brake operation may be "4" that is stronger than that of the road shape "A" and the vehicle speed at that time may be 15 km/h, because the traveling path is inclined downward to the intersection. For the road shape "H", the degree of the brake operation may be "5" that is stronger than that of the road shape "B" and the vehicle speed at that time may be 10 km/h, due to the necessity of the sharp steering wheel operation at the intersection. For the road shape "I", the degree of the brake operation may be "3" that is stronger than that of the road shape "C" and the vehicle speed at that time may be 20 km/h, due to the necessity of the gentle steering wheel operation at the intersection.

The pieces of data in the storage 120 may be added as appropriate each time the obtainer 110 acquires the current steering wheel steering data, the current accelerator or brake operation data, the current vehicle speed data, and the current front image data. In some embodiments, the same data may be deleted from a viewpoint of effective utilization of a storage capacity of the storage 120.

The extractor 130 may extract, from the data stored in the storage 120, the past steering wheel steering data, the past accelerator or brake operation data, and the past vehicle speed data that are identical or similar to road data obtained from the current front image data.

In some embodiments, the extractor 130 may extract, from the first vehicle data and the first image data stored in the storage 120, the first vehicle data that is identical or similar to the road data obtained from the second image data.

The pieces of data extracted by the extractor 130 may be outputted to the later-described comparator 140.

The comparator 140 may compare the current steering wheel steering data, the current accelerator or brake operation data, and the current vehicle speed data acquired by the obtainer 110 with the past steering wheel steering data, the past accelerator or brake operation data, and the past vehicle speed data extracted by the extractor 130, and obtain a difference value therebetween.

In some embodiments, the comparator 140 may compare the second vehicle data acquired by the obtainer 110 with the first vehicle data extracted by the extractor 130, and obtain the difference value between the second vehicle data and the first vehicle data.

The difference value obtained by the comparator 140 may be outputted to the later-described processor 150.

The processor 150 may control an operation of the vehicle 1 as a whole, based on a control program stored in an unillustrated memory such as ROM (Read Only Memory). In one embodiment, the processor 150 may serve as a "notification processor".

In the example embodiment, when the difference value obtained by the comparator 140 exceeds a predetermined value, the processor 150 may cause the later-described notifier 160 to make a notification that the difference value exceeds the predetermined value.

In some embodiments, the processor 150 may execute, when the difference value obtained by the comparator 140 exceeds the predetermined value, a notification that the difference value exceeds the predetermined value.

The "predetermined value" may be a value verified from a viewpoint of stable traveling of the vehicle 1.

Figure 4:
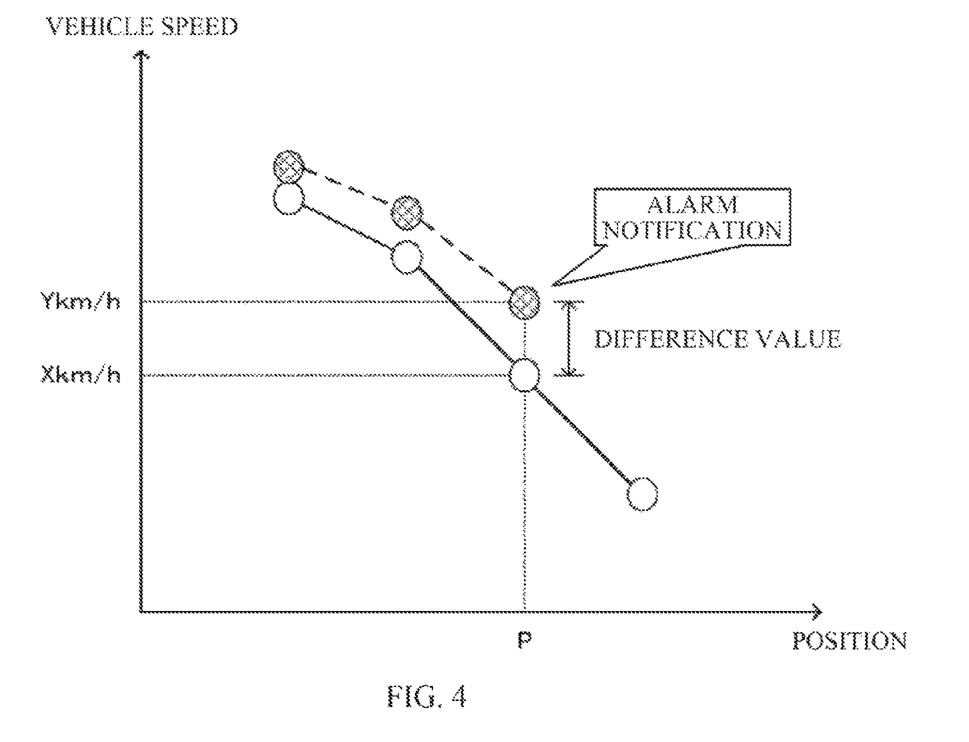
FIG. 4 is a graph illustrating an example of a timing at which a notification is to be executed in the vehicle illustrated in FIG. 1.

For example, as illustrated in FIG. 4, when the vehicle speed of the vehicle 1 at a position P is Y km/h faster than the vehicle speed X km/h of a similar case in the past and a difference value (Y−X) km/h therebetween exceeds the predetermined value, the processor 150 may cause the notifier 160 to make a notification that the difference value exceeds the predetermined value.

In some embodiments, when the difference value exceeds the predetermined value even after the notification, the processor 150 may instruct the later-described traveling processor 170 to perform a traveling control.

Figure 5:
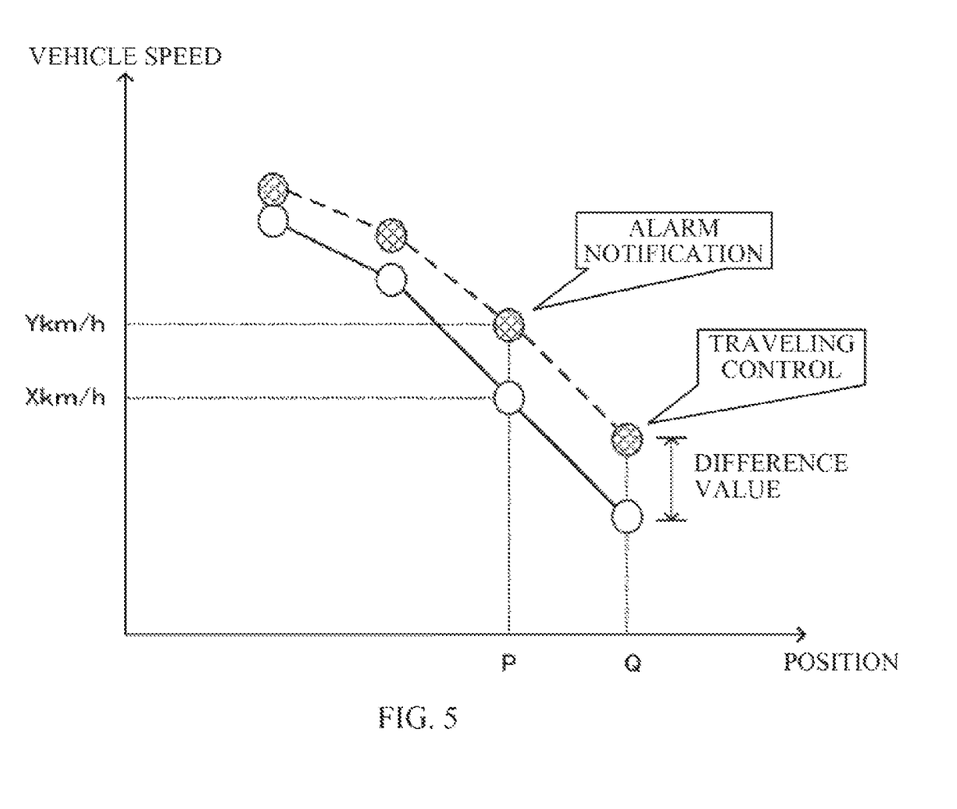
FIG. 5 is a graph illustrating an example of a timing at which an override of a traveling control process is to be performed in the vehicle illustrated in FIG. 1.

For example, as illustrated in FIG. 5, the processor 150 may instruct the traveling processor 170 to perform the traveling control, when there is no change in the situation where the difference value exceeds the predetermined value even when the vehicle 1 has reached a position Q despite having made the notification by the notifier 160 that the difference value (Y−X) km/h exceeds the predetermined value at the position P.

The notifier 160 may be a device such as a speaker, a display, or a vibrator provided in, for example, a sheet. The notifier 160 may cause a driver who drives the vehicle 1 to recognize notification information indicating that the difference value obtained by the comparator 140 has exceeded the predetermined value in response to a control signal outputted from the processor 150. The notifier 160 may provide the driver with the notification information by a factor such as voice, character, graphic display, or a vibration.

The traveling processor 170 may execute a travel assist control, based on a control signal outputted from the processor 150.

For example, the traveling processor 170 may so execute an override control as to deal with control values on the steering wheel steering operation, the accelerator or brake operation, and the vehicle speed included in the control signal outputted from the processor 150.

Process of Vehicle 1

An example of a process to be performed by the vehicle 1 according to the example embodiment will be described with reference to FIG. 6.

Figure 6:
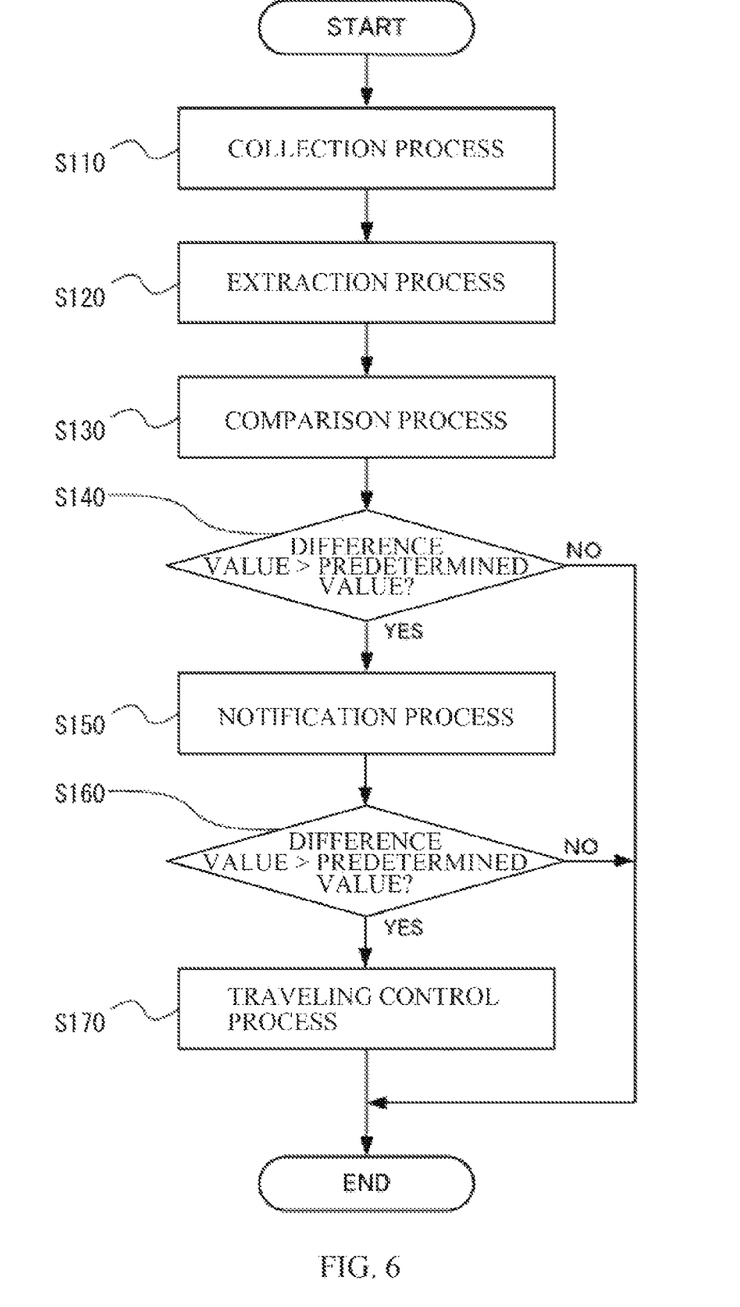
FIG. 6 is a diagram illustrating an example of a process to be performed by the vehicle illustrated in FIG. 1.

Referring to FIG. 6, the obtainer 110 may acquire the current steering wheel steering data, the current accelerator or brake operation data, the current vehicle speed data, and the current front image data (step S110).

The pieces of data collected by the obtainer 110 may be outputted to the extractor 130 or the comparator 140.

The extractor 130 may extract, from the data stored in the storage 120, the past steering wheel steering data, the past accelerator or brake operation data, and the past vehicle speed data that are identical or similar to the road data obtained from the current front image data (step S120).

The pieces of data extracted by the extractor 130 may be outputted to the comparator 140.

The comparator 140 may compare the current steering wheel steering data, the current accelerator or brake operation data, and the current vehicle speed data acquired by the obtainer 110 with the past steering wheel steering data, the past accelerator or brake operation data, and the past vehicle speed data extracted by the extractor 130, and obtain the difference value therebetween (step S130).

The difference value obtained by the comparator 140 may be outputted to the processor 150.

The processor 150 may determine whether the difference value obtained by the comparator 140 is greater than the predetermined value (step S140). If the processor 150 determines that the difference value obtained by the comparator 140 is less than the predetermined value ("NO" in step S140), the processor 150 may end the process.

If the processor determines that the difference value obtained by the comparator 140 is greater than the predetermined value ("YES" in step S140), the processor 150 may cause the notifier 160 to make the notification that the difference value is greater than the predetermined value (step S150).

After the notifier 160 has made the notification, the processor 150 may determine whether the difference value obtained by the comparator 140 is greater than the predetermined value again after a predetermined period of time has elapsed (step S160).

If the processor 150 determines that the difference value obtained by the comparator 140 is less than the predetermined value ("NO" in step S160), the processor 150 may end the process.

If the processor 150 determines that the difference value obtained by the comparator 140 is greater than the predetermined value ("YES" in step S160), the processor 150 may instruct the traveling processor 170 to perform the traveling control.

The traveling processor 170 may execute a traveling control process, based on the instructions issued from the processor 150 (step S170). Thereafter, the processor 150 may end the process.

Workings and Example Effects

In the vehicle 1 according to the example embodiment described above, the extractor 130 extracts, from the data stored in the storage 120, the past steering wheel steering data, the past accelerator or brake operation data, and the past vehicle speed data that are identical or similar to the road data obtained from the current front image data acquired by the obtainer 110. The comparator 140 compares the current steering wheel steering data, the current accelerator or brake operation data, and the current vehicle speed data acquired by the obtainer 110 with the past steering wheel steering data, the past accelerator or brake operation data, and the past vehicle speed data extracted by the extractor 130, and obtains the difference value therebetween. The processor 150 causes, when the difference value obtained by the comparator 140 exceeds the predetermined value, the notifier 160 to make the notification that the difference value exceeds the predetermined value.

In other words, based on the road data, the extractor 130 extracts, from the data stored in the storage 120, the past steering wheel steering data, the past accelerator or brake operation data, and the past vehicle speed data that are associated with the road data and that are identical or similar to the road data obtained from the current front image data acquired by the obtainer 110.

Thus, it is possible to obtain data directed to a verification as to whether a current driving operation performed on an identical or similar road is appropriate for a driving operation performed up to now.

In addition, the comparator 140 compares the current steering wheel steering data, the current accelerator or brake operation data, and the current vehicle speed data acquired by the obtainer 110 with the past steering wheel steering data, the past accelerator or brake operation data, and the past vehicle speed data extracted by the extractor 130, and obtains the difference value. Thus, it is possible to obtain digitized data directed to the verification as to whether the current driving operation performed on the identical or similar road is appropriate for the driving operation performed up to now.

Further, the processor 150 causes, when the difference value as a specific numerical value obtained by the comparator 140 exceeds the predetermined value, the notifier 160 to make the notification that the difference value exceeds the predetermined value, on the premise that the current driving operation performed on the identical or similar road is deviated from the driving operation performed up to now.

Accordingly, this configuration helps to execute a control that reduces a sense of discomfort to be given to the driver, even for a route on which the vehicle 1 travels for the first time.

In some embodiments, the vehicle 1 may include the traveling processor 170 that controls a travel state, and the processor 150 may instruct the traveling processor 170 to perform the traveling control when the difference value exceeds the predetermined value even after the notification is made by the notifier 160.

In some embodiments, the vehicle 1 may include the traveling processor 170 that performs the traveling control of the vehicle 1, and the processor 150 may instruct the traveling processor 170 to perform the traveling control when the difference value exceeds the predetermined value even after the execution of the notification.

In other words, when the deviation between the current driving operation performed on the identical or similar road and the driving operation performed up to now does not solve even by the notification made by the notifier 160, the processor 150 may cause the traveling control to activate on the premise that there is a large possibility of an increase in the sense of discomfort to be given to the driver and that there is a significant influence on the stable traveling of the vehicle 1. Thus, the processor 150 prevents the significant influence from occurring while reducing the sense of discomfort to be given to the driver.

Accordingly, this configuration helps to execute the control that reduces the sense of discomfort to be given to the driver, even for a route on which the vehicle 1 travels for the first time.

In some embodiments, the accelerator or brake operation data may include the operation timing.

In some embodiments, the accelerator or brake operation data may include the data on the timing at which the accelerator or the brake is operated.

In other words, the accelerator or brake operation data may include, in addition to the presence or absence of the operation of the accelerator or the brake and the degree of the operation of the accelerator or the brake, data on the timing at which the operation is performed.

This makes it possible to know, at such a timing, how much the accelerator or brake operation has been performed and thereby to allow for the more detailed comparison, based on a difference, obtained in time series, between the current driving operation performed on the identical or similar road and the driving operation performed up to now. Thus, even if the deviation between the current operation and the past operation is not solved, it is possible to cause the traveling control to be activated at an appropriate timing.

Accordingly, this configuration helps to execute the control that reduces the sense of discomfort to be given to the driver, even for a route on which the vehicle 1 travels for the first time.

First Modification Example

In the example embodiment described above, the storage 120 may store the past steering wheel steering data, the past accelerator or brake operation data, and the past vehicle speed data in association with the past front image data. In some embodiments, the front image data may include data on a peripheral feature, in addition to the road shape.

In general, for example, a situation of a road to be viewed by the driver can possibly be seen as being different between a case where buildings are scattered in the vicinity of an intersection and a case where there is no building in the vicinity of an intersection, and the vehicle speed can become higher than usual or a timing of the brake operation can become slower than usual at the clear intersection where there is no building.

Hence, based on the road data and the data including the feature in the vicinity thereof, the extractor 130 may extract, from the data stored in the storage 120, the past steering wheel steering data, the past accelerator or brake operation data, and the past vehicle speed data that are identical or similar to the road data and the data including the feature in the vicinity thereof. Accordingly, this configuration helps to execute the control that reduces the sense of discomfort to be given to the driver, even for a route on which the vehicle 1 travels for the first time.

Second Modification Example

In the example embodiment described above, the storage 120 may store the past steering wheel steering data, the past accelerator or brake operation data, and the past vehicle speed data in association with the past front image data. In some embodiments, the front image data may include data on a brightness in the vicinity of a road, in addition to the road shape. In some embodiments, the front image data may include data on a brightness in the vicinity of a road at night, in addition to the road shape.

In general, for example, a situation of a road to be viewed by the driver can possibly be seen as being different depending on a difference in brightness in the vicinity of an intersection, and performing a traveling control that does not take into consideration the brightness in the vicinity of the intersection can give unnecessary fear to the driver.

Hence, based on the road data and the data on the brightness in the vicinity of the road, the extractor 130 may extract, from the data stored in the storage 120, the past steering wheel steering data, the past accelerator or brake operation data, and the past vehicle speed data that are identical or similar to the road data and the data on the brightness in the vicinity of the road. Accordingly, this configuration helps to execute the control that reduces the sense of discomfort to be given to the driver, even for a route on which the vehicle 1 travels for the first time.

Third Modification Example

In the example embodiment described above, the storage 120 may store the past steering wheel steering data, the past accelerator or brake operation data, and the past vehicle speed data in association with the past front image data. In some embodiments, the front image data may include data on weather, in addition to the road shape.

In general, for example, a situation of a road to be viewed by the driver can possibly be seen as being different between a case of sunny weather and a case of rainy weather, and performing a traveling control that does not take into consideration the weather data can give unnecessary fear to the driver.

Hence, based on the road data and the data including the weather data, the extractor 130 may extract, from the data stored in the storage 120, the past steering wheel steering data, the past accelerator or brake operation data, and the past vehicle speed data that are identical or similar to the road data and the data including the weather data. Accordingly, this configuration helps to execute the control that reduces the sense of discomfort to be given to the driver, even for a route on which the vehicle 1 travels for the first time.

In some embodiments, it is possible to implement the vehicle 1 of the example embodiment of the disclosure by recording the process to be executed by a processor such as the processor 150 or the traveling processor 170 on a non-transitory recording medium readable by a computer system, and causing the computer system to load the program recorded on the non-transitory recording medium onto the processor such as the processor 150 or the traveling processor 170 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the obtainer 110, the storage 120, the extractor 130, the comparator 140, the processor 150, the notifier 160, and the traveling processor 170 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the obtainer 110, the storage 120, the extractor 130, the comparator 140, the processor 150, the notifier 160, and the traveling processor 170. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the obtainer 110, the storage 120, the extractor 130, the comparator 140, the processor 150, the notifier 160, and the traveling processor 170 illustrated in FIG. 1.

The invention claimed is:

1. A vehicle comprising:
a storage configured to store first vehicle data in association with first image data, the first vehicle data comprising past data of the vehicle on one or more of steering wheel steering data, accelerator or brake operation data, and vehicle speed data, the first image data comprising past image data of the vehicle on a region in front of the vehicle;
an obtainer configured to acquire second vehicle data and second image data, the second vehicle data comprising current data of the vehicle on the one or more of the steering wheel steering data, the accelerator or brake operation data, and the vehicle speed data, the second image data comprising current image data of the vehicle on the region in front of the vehicle;
an extractor configured to extract, from the first vehicle data and the first image data stored in the storage, the first vehicle data associated with a road shape or feature in the first image data that is identical or similar to a road shape or feature identified from the second image data;
a comparator configured to compare the second vehicle data acquired by the obtainer with the first vehicle data extracted by the extractor, and obtain a difference value between the second vehicle data and the first vehicle data;
a notification processor configured to execute, when the difference value obtained by the comparator exceeds a first value, a notification that the difference value exceeds the first value; and
a traveling processor configured to adjust vehicle behavior by controlling at least one of the steering, braking, and acceleration based on the difference value when detecting that the difference value, obtained again by the comparator after a predetermined period of time has elapsed from the notification, exceeds a second value greater than the first value.

2. The vehicle according to claim 1, further comprising a traveling processor configured to perform a traveling control of the vehicle, wherein
the notification processor is configured to instruct the traveling processor to perform the traveling control, when the difference value exceeds the predetermined value even after the execution of the notification.

3. The vehicle according to claim 1, wherein the accelerator or brake operation data comprises data on a timing at which an accelerator or a brake is operated.

4. The vehicle according to claim 2, wherein the accelerator or brake operation data comprises data on a timing at which an accelerator or a brake is operated.

5. A vehicle comprising:
a storage configured to store first vehicle data in association with first image data, the first vehicle data comprising past data of the vehicle on one or more of steering wheel steering data, accelerator or brake operation data, and vehicle speed data, the first image data comprising past image data of the vehicle on a region in front of the vehicle; and
circuitry configured to
acquire second vehicle data and second image data, the second vehicle data comprising current data of the vehicle on the one or more of the steering wheel steering data, the accelerator or brake operation data, and the vehicle speed data, the second image data comprising current image data of the vehicle on the region in front of the vehicle,
extract, from the first vehicle data and the first image data stored in the storage, the first vehicle data associated with a road shape or feature in the first image data that is identical or similar to road shape or feature identified from the second image data,
compare the acquired second vehicle data with the extracted first vehicle data to obtain a difference value between the second vehicle data and the first vehicle data,
execute, when the difference value exceeds a first value, a notification that the difference value exceeds the first value; and
adjust vehicle behavior by controlling at least one of the steering, braking, and acceleration based on the difference value when detecting that the difference value, obtained again by the comparator after a predetermined period of time has elapsed from the notification, exceeds a second value greater than the first value.

* * * * *